(12) United States Patent
Watson et al.

(10) Patent No.: US 7,033,130 B2
(45) Date of Patent: Apr. 25, 2006

(54) DEPALLETIZER FOR A MATERIAL HANDLING SYSTEM

(75) Inventors: Michael B Watson, Holland, MI (US); Troy E Coolbaugh, Belmont, MI (US); Thomas B Smith, Rockford, MI (US)

(73) Assignee: Rapistan Systems Advertising Corp., Grand Rapids, MI (US)

( * ) Notice: Subject to any disclaimer, the term of this patent is extended or adjusted under 35 U.S.C. 154(b) by 99 days.

(21) Appl. No.: 10/348,789

(22) Filed: Jan. 22, 2003

(65) Prior Publication Data

US 2003/0138312 A1    Jul. 24, 2003

Related U.S. Application Data

(60) Provisional application No. 60/350,574, filed on Jan. 22, 2002.

(51) Int. Cl.
*B65B /00* (2006.01)

(52) U.S. Cl. ................. 414/801; 414/796.2; 414/796.3

(58) Field of Classification Search ............ 414/796.2, 414/796.7, 796.3, 796.4, 796.8, 799, 928, 414/929, 801
See application file for complete search history.

(56) References Cited

U.S. PATENT DOCUMENTS

| | | | | |
|---|---|---|---|---|
| 3,070,240 A | * | 12/1962 | Yves | 414/789.2 |
| 3,592,329 A | * | 7/1971 | Fleischauer | 209/563 |
| 3,780,884 A | * | 12/1973 | Jones | 414/793 |
| 3,782,562 A | * | 1/1974 | Burt et al. | 414/789.6 |
| 3,842,719 A | * | 10/1974 | Fernandez-Rana et al. | 198/418.9 |
| 3,863,776 A | * | 2/1975 | Harman | 414/799 |
| 3,955,613 A | * | 5/1976 | Lund | 164/130 |
| 4,073,388 A |   | 2/1978 | Carter | 214/8.5 |
| 4,358,236 A | * | 11/1982 | Dudley | 414/795.3 |
| 4,743,154 A | * | 5/1988 | James et al. | 414/788.5 |
| 4,753,564 A | * | 6/1988 | Pearce et al. | 414/796 |
| 4,946,340 A | * | 8/1990 | Murphy et al. | 414/788.8 |
| 5,096,367 A | * | 3/1992 | Winski | 414/801 |
| 5,096,369 A | * | 3/1992 | Ouellette | 414/788.7 |

(Continued)

FOREIGN PATENT DOCUMENTS

EP          0960843          3/2003

OTHER PUBLICATIONS

One sheet of a drawing enlarged onto two sheets (three sheets total) of a prior art depalletizer system sold or offered for sale at least as early as Jan. 22, 2001.

*Primary Examiner*—Gene O. Crawford
*Assistant Examiner*—Rashmi Sharma
(74) *Attorney, Agent, or Firm*—Van Dyke, Gardner, Linn & Burkhart, LLP (57) ABSTRACT

A depalletizer includes an input assembly for supporting a loaded pallet loaded with at least one product, a lift assembly, and a product take-away assembly. The input assembly presents the loaded pallet to the lift assembly, which moves the loaded pallet to a product unloading elevation. The product take-away assembly is positioned for receiving a product from the pallet at the unloading elevation. The depalletizer assembly also includes a pallet take-away assembly. After the product is unloaded from the pallet, the lift assembly moves the unloaded pallet to a pallet discharge elevation, where the pallet take-away assembly is positioned to receive an unloaded pallet from the lift assembly.

19 Claims, 7 Drawing Sheets

U.S. PATENT DOCUMENTS

| | | | |
|---|---|---|---|
| 5,118,243 A * | 6/1992 | Huebner et al. | 414/404 |
| 5,158,424 A * | 10/1992 | Mojden et al. | 414/799 |
| 5,207,727 A * | 5/1993 | Pearce et al. | 414/792.7 |
| 5,222,857 A * | 6/1993 | Hasegawa | 414/788.4 |
| 5,237,936 A * | 8/1993 | Susel et al. | 108/52.1 |
| 5,415,520 A * | 5/1995 | Seiver | 414/799 |
| 5,451,136 A | 9/1995 | Easton | 414/795.8 |
| 5,562,403 A * | 10/1996 | Winski | 414/799 |
| 5,607,282 A | 3/1997 | Brannen et al. | 414/796.3 |
| 5,716,189 A * | 2/1998 | Winski et al. | 414/800 |
| 5,788,461 A | 8/1998 | Easton et al. | 414/796.2 |
| 5,899,659 A | 5/1999 | Beilsmith | 414/796.2 |
| 5,913,655 A | 6/1999 | Maday | 414/797.2 |
| 5,970,834 A | 10/1999 | Garofano et al. | 83/90 |
| 6,048,166 A | 4/2000 | Stingel, Jr. et al. | 414/796.9 |
| 6,089,819 A | 7/2000 | Barnes | 414/794.7 |
| 6,152,681 A * | 11/2000 | Vincent et al. | 414/789.9 |
| 6,152,683 A * | 11/2000 | Linder | 414/801 |
| 6,290,448 B1 * | 9/2001 | Focke et al. | 414/222.01 |
| 6,558,103 B1 * | 5/2003 | Lilley | 414/356 |

* cited by examiner

DEPALLETIZER FOR A MATERIAL HANDLING SYSTEM

TECHNICAL FIELD AND BACKGROUND OF THE INVENTION

The present invention relates to a material handling system and, more particularly, to an apparatus and method of unloading pallets in a material handling system.

Pallets are platforms constructed of wood members that are configured for handling by a forklift and are used for transporting products, such as cartons, that can be stacked on the pallet. Pallets are particularly suitable for transporting products that are difficult to individually handle. Most products are delivered to warehouses on pallets, where the products must be unloaded from the pallets so that the products can be processed at the warehouse by a material handling system. Once unloaded, the pallets are collected and then returned for reuse.

While pallets offer many advantages, pallets are heavy and hard to handle. In addition, tolerances in the wood materials and construction result in variations in their shapes and dimensions. While these variations typically do not impact their handling by forklifts, other handling devices, such as conveyors and sorting devices, are more sensitive to these variations. In addition, over time, pallets tend to develop irregularities in their shape due to repairs or loose members. As a result, automating the handling of pallets creates many challenges.

One common method of unloading a pallet includes the use of a tilt table. The tilt table tilts the loaded pallet so that the containers or products supported on the pallets slide or roll onto a take-away conveyor. However, this unloading method is not suitable for all products. Furthermore, as noted above, pallets tend to vary in their dimensions and shapes, which is hard to accommodate in these automated depalletizers. As a result, pallets tend to jam in the depalletizer, thus, stopping the throughput of the material handling system.

Consequently, there is a need for an improved depalletizer assembly, which can accommodate the variations and pallet dimensions and shapes while maximizing the throughput of the material handling system incorporating the depalletizer assembly of the present invention.

SUMMARY OF THE INVENTION

Accordingly, the present invention provides an improved depalletizer assembly that unloads pallets and processes the unloaded pallets in a manner that reduces jamming and, therefore, operates with a substantially increased throughput over conventional depalletizers.

In one form of the invention, a depalletizer assembly includes an input assembly for supporting a loaded pallet loaded with at least one product, a lift assembly, and a product take-away assembly. The input assembly presents the loaded pallet to the lift assembly, which moves the loaded pallet to a product unloading elevation. The product take-away assembly is positioned for receiving a product from the pallet at the unloading elevation. The depalletizer assembly also includes a pallet take-away assembly. After the product is unloaded from the pallet, the lift assembly moves the unloaded pallet to a pallet discharge elevation, where the pallet take-away assembly is positioned to receive an unloaded pallet from the lift assembly.

In one aspect, the input assembly comprises a conveyor, including for example a chain conveyor. In another aspect, the input assembly comprises a plurality of input conveyor sections, with the lift assembly raising and lowering one of the input conveyor sections to thereby move the pallet.

In yet another aspect, the depalletizer assembly further includes an empty pallet lift assembly, with the pallet take-away assembly transferring the unloaded pallet to the empty pallet lift assembly, which moves the unloaded pallets to a second pallet discharge elevation for discharging the unloaded pallets.

In a further aspect, the depalletizer assembly also includes an output assembly onto which the empty pallet lift assembly discharges the unloaded pallet. For example, the output assembly may comprise a track conveyor.

According to another aspect, the depalletizer assembly further includes a second input assembly for supporting a second loaded pallet and a second lift assembly. The second input assembly presents the second loaded pallet to the second lift assembly, which moves the second loaded pallet to the product unloading elevation aligned with the product take-away assembly wherein the product on the second loaded pallet can be unloaded onto the product take-away assembly. The second lift assembly thereafter moves the unloaded pallet to the pallet discharge elevation. A second pallet take-away assembly is positioned for receiving an unloaded pallet from the second lift assembly at the pallet discharge elevation. In addition, the depalletizer may further include an empty pallet lift assembly, with both pallet take-away assemblies transferring the unloaded pallets to the empty pallet lift assembly, which moves the unloaded pallets to a second pallet discharge elevation for discharging the unloaded pallets. Furthermore, the depalletizer assembly may also include an output assembly, with the empty pallet lift assembly discharging the unloaded pallets onto the output assembly.

In another form of the invention, a depalletizer assembly includes an input conveyor for conveying a loaded pallet loaded with a product, a lift assembly, a product take-away conveyor, and a pallet take-away conveyor. The input conveyor conveys the loaded pallet to the lift assembly, which raises the loaded pallet to a product unloading elevation where the product can be unloaded. The product take-away conveyor is positioned for receiving the product from the pallet at the product unloading elevation. Thereafter, the lift assembly lowers the unloaded pallet to a pallet discharge elevation below the product unloading elevation where the unloaded pallet is transferred to the pallet take-away conveyor.

In one aspect, the depalletizer assembly further includes a second lift assembly and a second input conveyor for conveying a second loaded pallet to the second lift assembly. The second lift assembly raises the second loaded pallet to the product unloading elevation, which is aligned with the product take-away conveyor, wherein the product on the second loaded pallet can be unloaded onto the product take-away conveyor. After unloading, the second lift assembly lowers the unloaded pallet to the pallet discharge elevation, where a second pallet take-away conveyor is positioned for receiving the unloaded pallet.

In yet another aspect, the depalletizer assembly further includes an empty pallet lift assembly, with the pallet take-away conveyors transferring the unloaded pallets to the empty pallet lift assembly, which lowers the unloaded pallets to a second pallet discharge elevation for discharging the unloaded pallets.

In a further aspect, the depalletizer assembly includes a platform, which provides support for an operator at the product unloading elevation. Preferably, the platform is positioned for supporting the operator at the pallet discharge elevation, as well, whereby the operator can move the products from the pallet on the lift assembly onto the product take-away conveyor and can at least assist in guiding the unloaded pallet from the lift assembly to the pallet take-away conveyor.

These and other objects, advantages, purposes, and features of the invention will become more apparent from the study of the following description taken in conjunction with the drawings.

DESCRIPTION OF THE PREFERRED EMBODIMENTS

Figure 1:
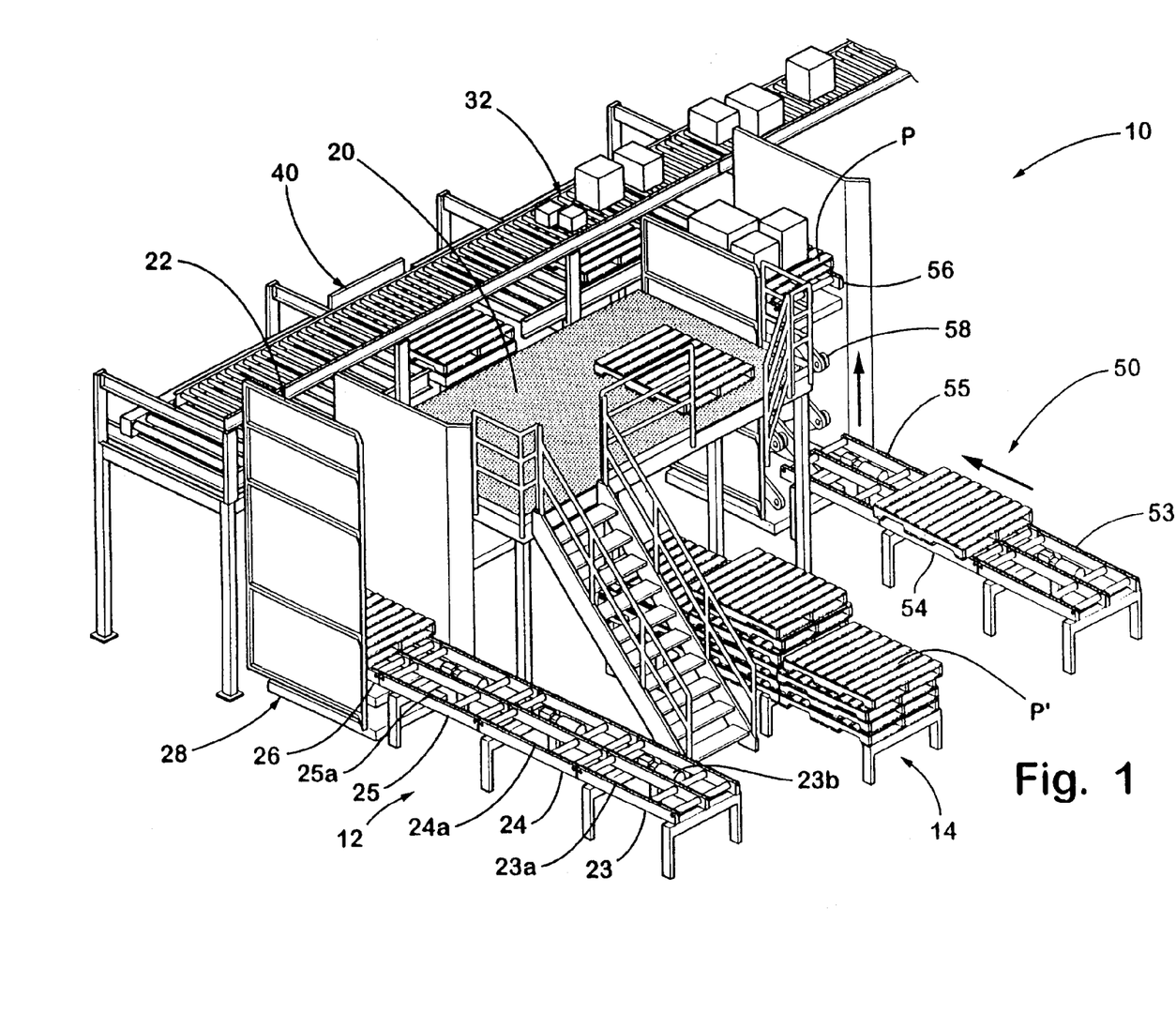
FIG. 1 is a front perspective view of a depalletizer assembly of the present invention.
Figure 2:
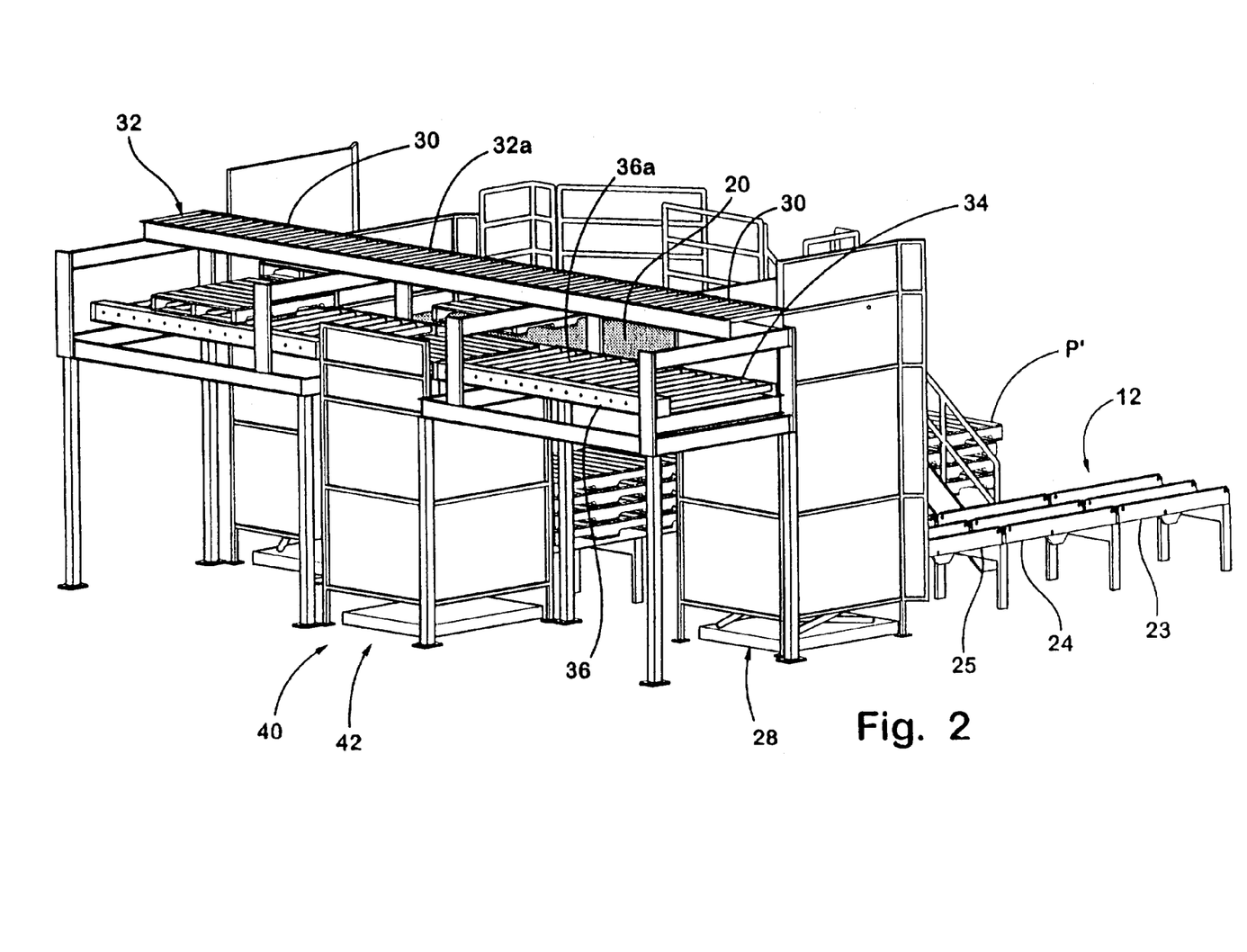
FIG. 2 is a rear perspective view of the depalletizer assembly of FIG. 1.

Referring to FIG. 1, the numeral 10 generally designates a depalletizer assembly suitable for use in a material handling system where articles are at least initially handled using pallets. Depalletizer assembly 10 enables articles, such as cartons, to be removed from pallets in an efficient manner by an operator while minimizing the stress on the operator and, further, in a manner that permits the unloaded pallets to be handled with minimal interruptions to the throughput of the material handling system.

Figure 3:
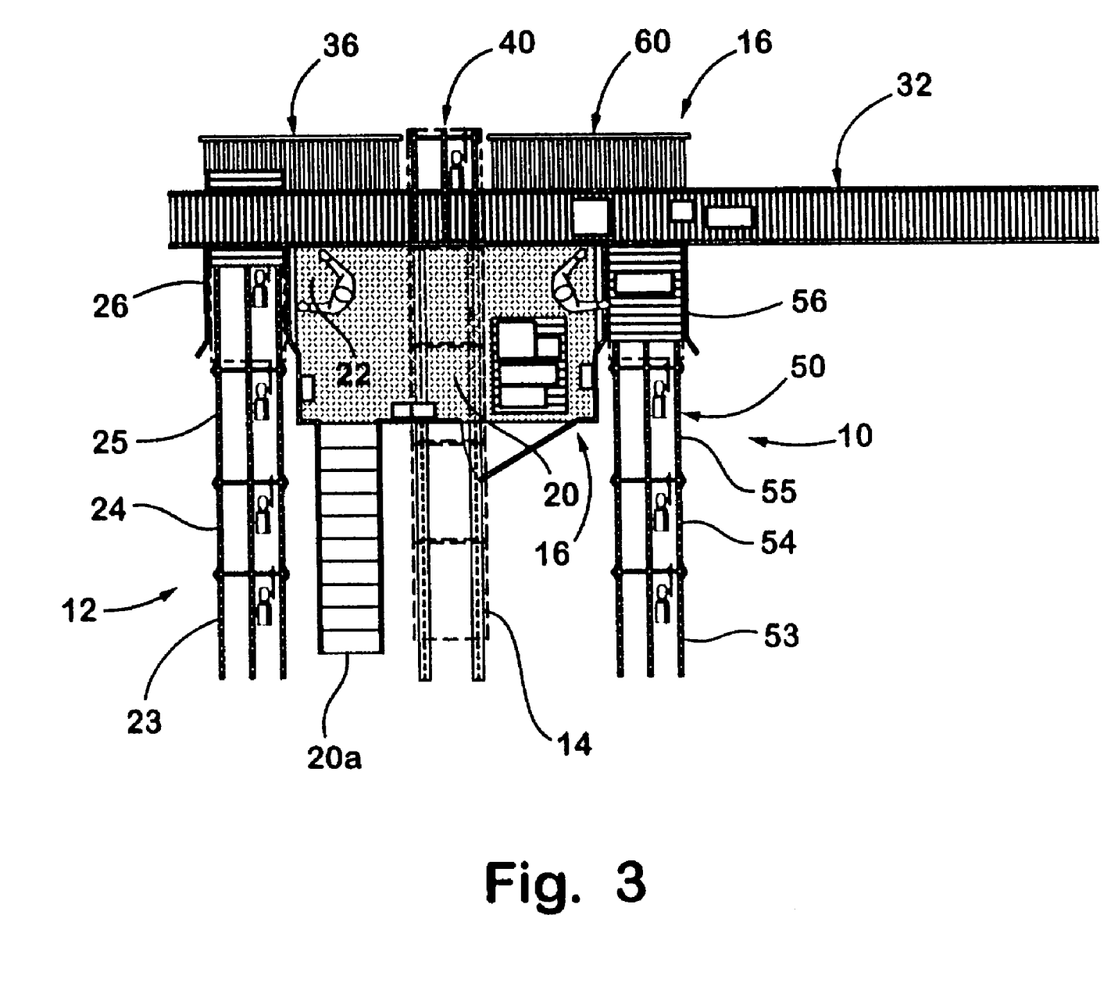
FIG. 3 is a plan view of the depalletizer assembly of FIG. 1.
Figure 5:
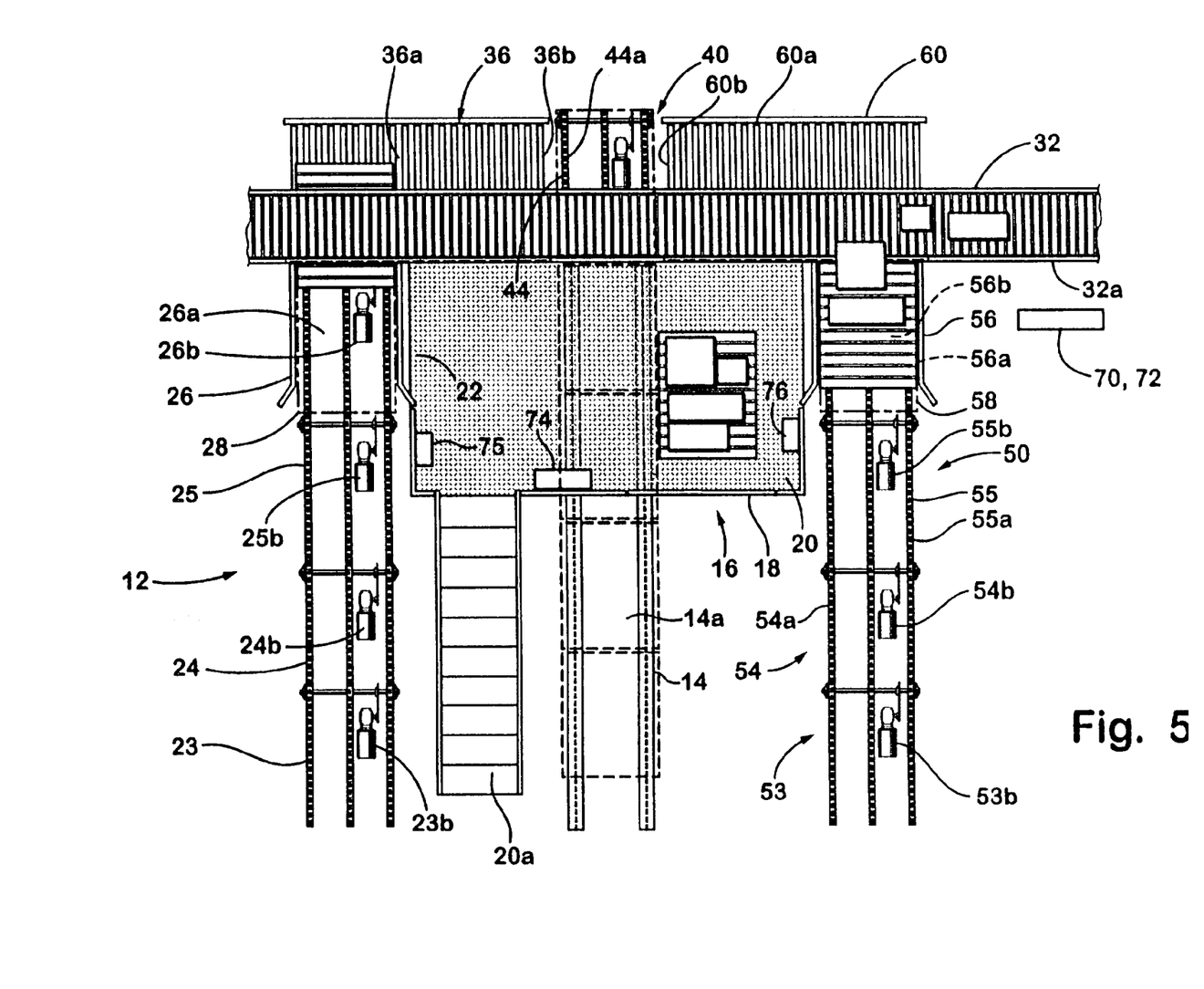
FIG. 5 is an enlarged plan view of the depalletizer assembly of FIG. 4.

As best seen in FIGS. 1, 3, and 5, depalletizer assembly 10 includes an input assembly 12 and an output assembly 14. Input assembly 12 comprises a conveyor that delivers loaded pallets P for unloading by an operator. Output assembly 14, which also comprises a conveyor, such as a gravity conveyor or flow track conveyor, receives unloaded pallets P', which are optionally stacked in groups, on conveyor 14 for recycling of the unloaded pallets P'. The downstream path of the unloaded pallets P' from assembly 14 may vary depending on the application and, therefore, will not be described more fully herein since it is not part of the present invention.

Figure 4:
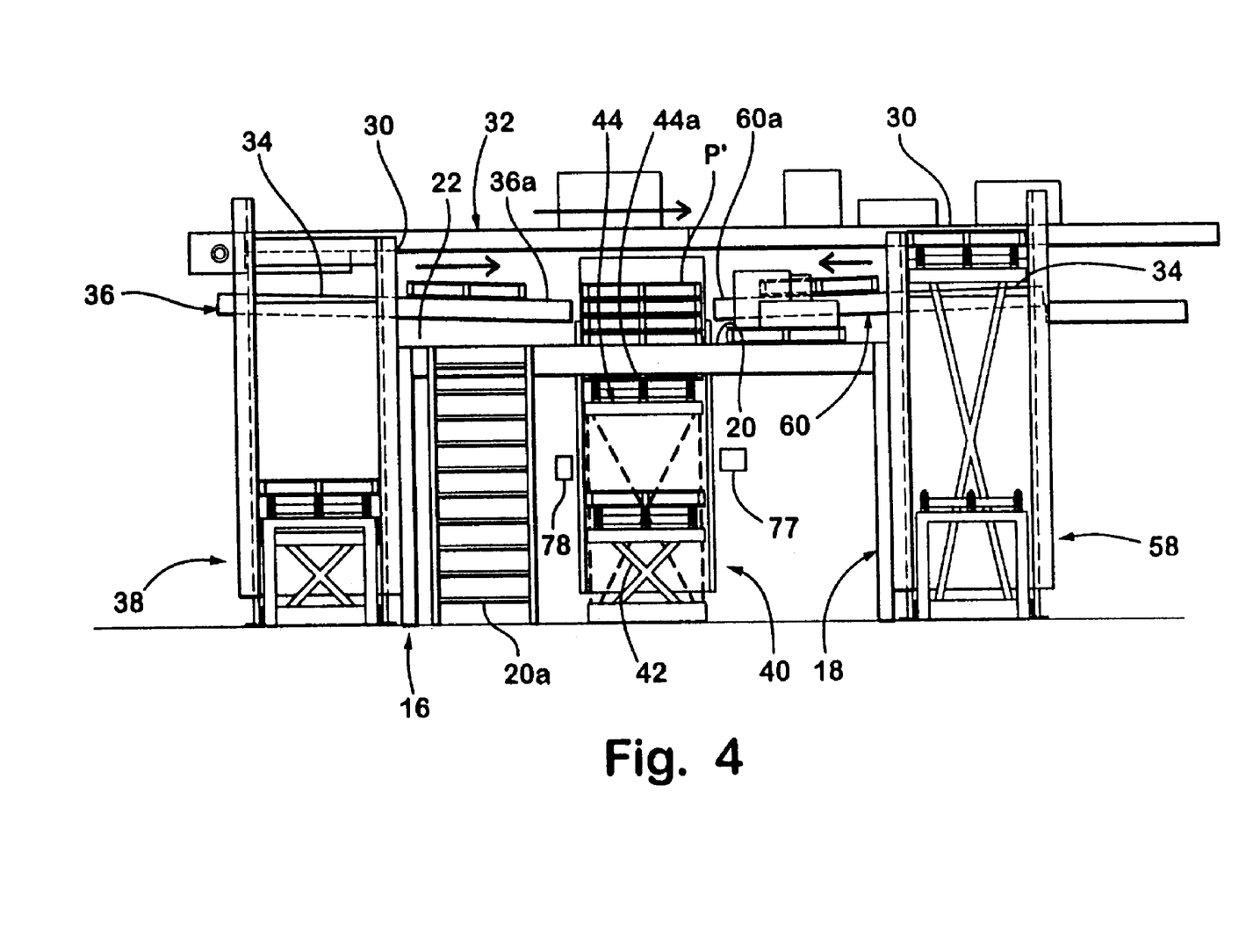
FIG. 4 is a front elevation view of the depalletizer assembly of FIG. 3.

In the illustrated embodiment, input assembly 12 is a chain accumulation conveyor, which is conventional and well known in the art. As noted above, output assembly 14 comprises a conveyor, such as a gravity conveyor or flow track conveyor, which is also well known in the art. However, it should be understood that assemblies 12 and 14 may comprise other types of conveyors, including but not limited to belt or roller conveyors or the like. Assemblies 12 and 14, respectively, deliver loaded pallets P to and receive unloaded pallets P' from a raised platform 16 where the operator processes the loaded and unloaded pallets. Referring to FIG. 4, platform 16 includes a frame 18 that supports a platform floor or base 20 on which the operator stands. On one side of platform base 20 is a product unloading station or location 22 where pallets P (supported on conveyor 12) are unloaded by the operator. On the other side is an optional second product unloading station described in greater detail below.

Referring to FIG. 5, input assembly 12 comprises a plurality of conveyor sections 23, 24, 25, and 26, with each conveyor section having a conveying surface 23a, 24a, 25a, and 26a, and a driver 23b, 24b, 25b, and 26b for driving its respective conveying surface. Conveyor section 26 incorporates a full or loaded pallet lift assembly 28, such as a scissor lift assembly, which raises conveyor section 26 so that its conveying surface 26a can be raised and lowered. Conveying surface 26a is raised to a product unloading elevation 30 at unloading station 22, which generally coincides with the waist level of the operator so that the products or articles (supported on conveying surface 26a) can be moved from the pallet with minimal stress to the operator.

Extending across another side of platform 16 is a product take-away conveyor 32. Conveyor 32 is positioned so that its conveying surface 32a is generally at the waist level of the operator and generally aligned in the same plane as the conveying surface 26a of conveyor section 26 when conveyor section 26 is raised by lift assembly 28 to unloading elevation 30. In this manner, the operator does not have to bend when moving products from conveying surface 26a to conveying surface 32a. Furthermore, conveyor 32 is placed in close proximity to the outer free end of conveyor section 26 so that the operator does not have to reach far, if at all, when moving products between the respective conveying surfaces of input conveyor section 26 and product take-away conveyor 32. In the illustrated embodiment, conveyor 32 comprises a roller conveyor, which is commonly known in the art. It can be appreciated that conveyor 32 may comprise other types of conveyors, such as a belt conveyor or the like.

After the products are removed from conveying surface 26a of conveyor section 26, lift assembly 28 lowers conveyor section 26 so that its conveying surface 26a is lowered to a pallet discharge elevation 34 (FIG. 4) and aligned with a conveying surface 36a of another conveyor 36. Conveyor 36 comprises a pallet take-away conveyor and is positioned so that its conveying surface 36a is below conveyor 32 also generally at or at least close to the waist level of the operator. In this manner, when conveyor section 26 is lowered to pallet discharge elevation 34, the operator may move the pallets from conveying surface 26a of conveyor section 26 to conveying surface 36a of pallet take-away conveyor 36. In the illustrated embodiment, conveyor 36 comprises a roller conveyor and is tilted so that the pallet supported on its conveying surface 36a is moved under or at least assisted by the force of gravity to a second or empty pallet lift assembly 40, which is located at the free end 36b of conveyor 36 and aligns with conveying surface 36a. In this manner, conveyor 36 feeds the unloaded pallet P' onto the lift assembly 40. Though, it should be understood that the operator may need to assist in the transfer of the unloaded pallet over conveying surface 36a and onto lift assembly 40. While illustrated as a roller conveyor, conveyor 36 may comprise another type of conveyor, such as a belt or chain conveyor or the like.

Lift assembly 40 includes a lift mechanism 42 (FIG. 4), such as a scissor lift mechanism, and a conveyor 44 (FIG. 5), which includes a conveying surface 44a for aligning with the conveying surface 36a of conveyor 36. After an empty pallet P' is loaded onto lift assembly 40, lift mechanism 42 lowers conveyor 44 to thereby lower the conveying surface 44a below conveying surface 36a of conveyor section 36. Preferably, lift assembly 40 lowers the unloaded pallet P' such that its upper surface is generally aligned with the conveying surface 36a of conveyor 36 so that when a second unloaded pallet is transferred to conveyor 36, conveyor 36 will deliver the unloaded pallet on top of the first unloaded pallet, which is supported on lift assembly 40.

Output assembly 14 is aligned with lift assembly 40 so that when lift assembly 40 is loaded with a pre-selected number of unloaded pallets, the conveying surface 44a of conveyor section 44 is lowered to a second pallet discharge elevation where conveying surface 44a is aligned with the conveying surface 14a of output assembly 14 so that the unloaded pallet or pallets can be transferred onto the output assembly 14. Optionally, lift assembly 40 may deliver a single unloaded pallet onto output conveyor 14; however, in order to increase the efficiency of depalletizer assembly 10, it is preferable that the unloaded pallets are transferred onto output assembly 14 in stacks.

In order to transfer the unloaded pallets from lift assembly 40 to output assembly 14, conveyor section 44 comprises a driven conveyor section, for example a driven chain conveyor or the like. Though, it should be understood that this transfer could be done manually by an operator.

Optionally, in order to increase the throughput of the depalletizer assembly, depalletizer assembly 10 may incorporate a second input assembly 50, which is of similar construction to input assembly 12 and includes a plurality of conveyor sections 53, 54, 55, and 56, with each conveyor section having its own conveying surface 53a, 54a, 55a, and 56a and its own driver 53b, 54b, 55b, and 56b, respectively. Similar to conveyor section 26, conveyor section 56 incorporates a lift assembly 58 (FIG. 4), which raises and lowers conveyor section 56 to raise its conveying surface 56a to product unloading elevation 30 at the second unloading station and to align with conveying surface 32a of conveyor 32 where the pallets can be unloaded of products from the other side of platform 16. After these pallets are unloaded, conveyor section 56 is lowered to pallet discharge elevation 34 so that its conveying surface 56a aligns with a conveying surface 60a of a second pallet take-away conveyor 60. Conveyor 60 is of similar construction to conveyor 36 and provides a gravity-feed of the unloaded pallets to lift assembly 40, which is positioned at its outer free edge 60b. In this manner, unloaded pallets can be fed to lift assembly 40 from both sides.

It should be understood from the foregoing that conveyor sections 23, 24, and 25 may be combined in a single conveyor section, with conveyor section 26 being a separate conveyor section with its own drive assembly 26b. Similarly, conveyor sections 53, 54, and 55 may comprise a single conveyor section with a single drive assembly, with conveyor section 56 comprising a separate conveyor section with its own drive assembly 56b.

Figure 7:
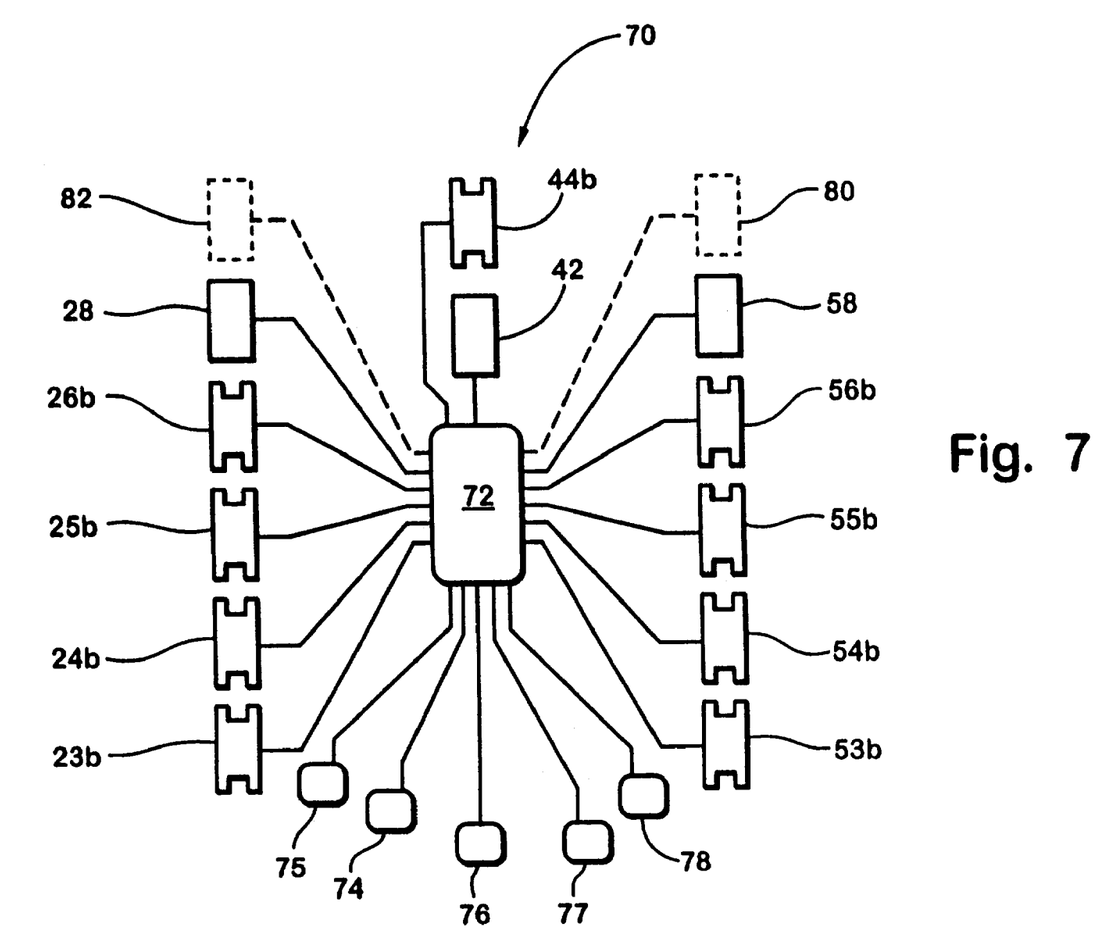
FIG. 7 is a schematic drawing of the control system of the depalletizer assembly of the present invention.

In the preferred embodiment, depalletizer assembly 10 is controlled by a control system 70 that includes a controller 72, such as a programmable logic controller. Controller 72 supplies power to and controls the drivers of each conveyor section 23, 24, 25, 26, 53, 54, 55, and 56 and each lift assembly 28, 58, and 40. Optionally, controller 72 operates both in manual and automatic modes. Control system 70 further includes a control station 74, which is located on the platform (FIG. 5), for example, by the stairs (20a), which includes a plurality of user-actuatable devices, such as buttons and switches, for communicating with controller 72. For example, control station 74 includes a user actuatable device, such as a start/stop button, that starts and stops the system. Control station 74 further optionally includes a user actuatable device, such as a switch, to select whether the system is in a manual or automatic mode of operation. To control the various components during manual operation, control station 74 includes user actuatable devices, such as foot switches, which either trigger controller 72 to operate the lifts or which provide manual control for the lift assemblies depending on which mode is selected. For example, control station 75 & 76 may include a user actuatable device or devices for each lift assembly, such as a foot switch for raising each lift assembly and a button for lowering each lift assembly. Furthermore, control station 75 & 76 may include a user-actuator device, such as empty pallet release buttons, which actuate the drivers 26b and 56b of conveyor sections 26 and 56 to transfer and release the empty pallet from the respective lift assemblies 28 and 58. In addition, this same button may be used to lower lift assembly 40 when the pallet is in the lift location.

To provide further control in the manual mode, control system 70 includes control station 77 & 78, which may be located, for example, at the lower level of the empty pallet lift assembly 40. Control station 77 & 78 may include a user actuatable device, for example a jog empty pallet button, which actuates the driver of conveyor 44 to move its conveying surface 44a forward to deposit the unloaded pallet or pallets onto output assembly 14.

In normal system operation, when the "start" button is pressed, the warning horn will sound and the system will start. Assuming controller 72 is in its automatic mode, pallets loaded on input assembly 12 are conveyed along the respective conveying surface 23a, 24a, 25a, and 26a of conveyor sections 23, 24, 25, and 26 to the next open position. In order to track the position of the pallets, control system 70 preferably includes a plurality of sensors, such as photo eyes, to detect the movement of the loaded and unloaded pallets. For example, sensors may be used to detect when a pallet is in position on the respective conveyor sections. Sensors may also be used to detect when an unloaded pallet has been transferred to the respective pallet take-away conveyor 36 or 60 and when an unloaded pallet is in position on lift assembly 40. Furthermore, sensors may be used to detect when an unloaded pallet has been transferred onto output assembly 14.

When a loaded pallet is positioned on conveyor section 26, lift assembly 28 is actuated by controller 72 to raise conveyor section 26 so that the products on the loaded pallet are positioned at unloading elevation 30 for unloading and optional labeling. After the operator or handler has emptied the pallet, the operator will push an empty pallet release button, which is preferably located on the side of platform 20 closest to input assembly 12. When the empty pallet release button has been actuated, lift assembly 28 will be actuated to lower until conveying surface 26a is aligned with pallet take-away conveyor 36. Furthermore, after reaching the pallet discharge elevation, driver 26b of conveyor section 26 will be actuated to transfer the empty pallet from conveyor section 26 onto the pallet take-away conveyor 36. Since conveyor 36 comprises a gravity conveyor, as noted before, the operator may need to assist in transferring the empty pallet over to the empty pallet lift assembly 40. Once the empty pallet is positioned on the empty pallet lift assembly 40, the operator will press the empty pallet release button to complete the empty pallet release sequence. After the empty pallet release sequence, controller 72 lowers lift assembly 40 one pallet position so the upper surface of the unloaded pallet aligns with the conveying surfaces of the respective pallet take-away conveyors 36 and 60. In addition, controller 72 actuates the respective full pallet lift assembly 28 or 58 so that it is ready to accept another full pallet from respective input assembly 12 or 50. The same procedure is used for both input assemblies.

For manual operation, the operator will actuate a user actuatable device, such as a raise full pallet lift foot switch associated with input assembly 12. After unloading the products from the pallet onto conveyor section 32, the operator will actuate a user actuatable device, such as the lower full pallet assembly button, to lower lift assembly 28 until the pallet is aligned with conveyor 36. Once aligned with conveyor 36, the operator will actuate, for example, the empty pallet release button that will release the empty pallet from lift assembly 28. After the empty pallet is moved to the empty pallet lift assembly, as detected by a sensor, such as a photo eye, the empty pallet lift 40 will be actuated to lower the empty pallet. Preferably, the operator of the depalletizer assembly will then move over platform floor 20 to move the products on the pallet that is positioned on lift assembly 58 and transfer the products onto conveyor 32. While positioned on the other side of the platform floor, the operator will press a user actuatable device, such as a foot switch, to raise the lift assembly 28 to position another loaded pallet for unloading. After the operator has unloaded the loaded pallet on lift assembly 58, the operator will actuate the pallet release button so that lift assembly 58 will lower and transfer the empty pallet from lift assembly 58 and onto conveyor 60. The operator may assist in the transfer of the empty pallet to the empty pallet lift assembly 40. Once positioned on lift assembly 40, the operator will press the empty pallet release button so that lift assembly 40 will lower the pallet stack one pallet position to be ready to accept the next unloaded or empty pallet. In addition, lift assembly 58 will lower to be ready to accept the next full pallet. In order to reduce the risk of injury to the operator, the empty pallet release button is preferably located on the side of the platform adjacent input assembly 12. In this way, the operator is located on the other side of the platform when lift assembly 58 is actuated.

Figure 6:
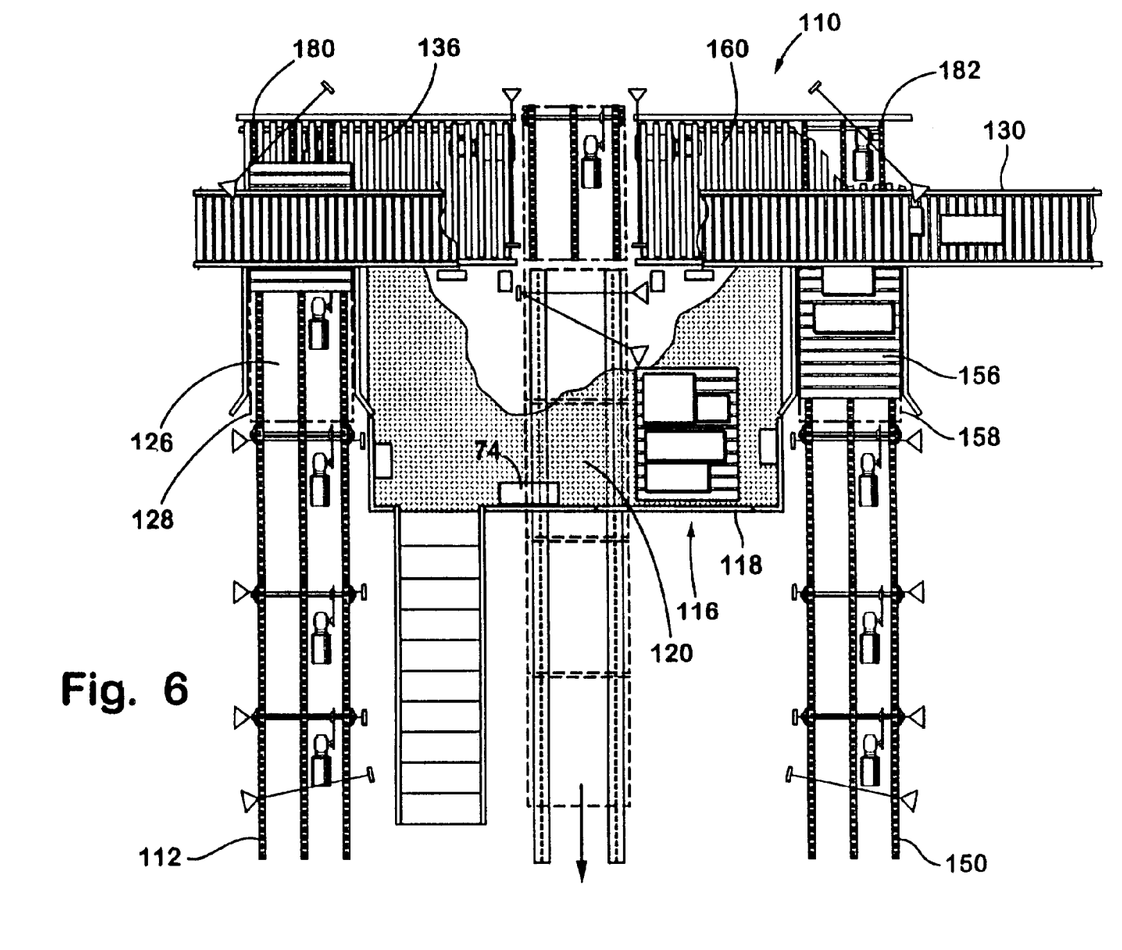
FIG. 6 is an enlarged plan view of another embodiment of the depalletizer assembly of the present invention.

Referring to FIG. 6, the numeral 110 generally designates another embodiment of the depalletizer assembly of the present invention. Depalletizer assembly 110 is similar to depalletizer assembly 10 and includes first and second input-assemblies 112 and 150, which are similar to input assemblies 12 and 50, respectively, and a control system similar to control system 70. Assembly 110 further includes a platform 116 with a frame 118 that supports a platform floor 120 on which an operator of the depalletizer assembly stands to remove products, such as containers, from the loaded pallets that are presented on either side of platform floor 120 similar to the previous embodiment.

As previously described in reference to the first embodiment, input assemblies 112 and 150 include conveyor sections 126 and 156, which are raised and lowered by respective lift assemblies 128 and 158. After a loaded pallet is raised by lift assembly (128 or 158) and aligned with product take-away conveyor 130, the operator unloads the pallet, then presses the empty pallet release button, which then lowers lift assembly (128 or 158) to discharge the empty pallet onto the respective pallet take-away conveyor. In the illustrated embodiment, each pallet take-away conveyor 136, 160 incorporates a respective transfer assembly 180, 182, which assists in the transfer of the empty pallet from the respective conveyor sections (126, 156) to take-away conveyors 136 and 160. Transfer assemblies 180 and 182 comprise chain conveyors, which are positioned between the respective rollers of conveyors 136 and 160. Transfer assemblies 180 and 182 are actuated by control system 70. In this manner, depalletizer assembly 110 is more automated than depalletizer assembly 10 and may further reduce the strain on the operator. In addition, conveyors 136 and 160 may comprise driven conveyors, which are similarly controlled by the operator with the control system, which would further automate the depalletizer of the present invention.

While several forms of the invention have been shown and described, other forms will now be apparent to those skilled in the art. Therefore, it will be understood that the embodiments shown in the drawings and described above are merely for illustrative purposes, and are not intended to limit the scope of the invention, which is defined by the claims which follow, as interpreted under the principles of patent law including the doctrine of equivalents.

We claim:

1. A method of depalletizing a loaded pallet, said method comprising:
    conveying loaded pallets on a loaded pallet conveyor to a lift location in a conveying direction;
    raising a loaded pallet with a lift assembly at the lift location to an unloading elevation;
    manually unloading the products from the loaded pallet at the unloading elevation onto a product conveyor;
    conveying the products on the product conveyor away from the lift location;
    lowering the unloaded pallet to a first pallet discharge elevation;
    conveying the unloaded pallet in the conveying direction with the loaded pallet conveyor from the lift location at the first pallet discharge elevation to an unloaded pallet conveyor;
    conveying the unloaded pallet on the unloaded pallet conveyor to a second lift location; and
    lowering the unloaded pallet to a second pallet discharge elevation below the first pallet discharge elevation for discharging the unloaded pallet.

2. The method according to claim 1, further comprising lowering the unloaded pallet to an intermediate elevation below the first pallet discharge elevation wherein an upper side of the unload pallet is generally aligned with the first pallet discharge elevation for receiving another unloaded pallet thereon before lowering the unloaded pallet to the second discharge elevation.

3. The method according to 1, wherein conveying the loaded pallets includes conveying the loaded pallets on a roller conveyor.

4. The method according to claim 1, further comprising conveying the unloaded pallets on another pallet conveyor after lowering the unloaded pallets to the second pallet discharge elevation.

5. The method according to claim 4, wherein said conveying the unloaded pallets includes conveying the unloaded pallers in stacks.

6. The method according to claim 3, wherein raising a loaded pallet includes raising a group of the rollers of the roller conveyor to thereby raise the loaded pallet.

7. A method of depalletizing a loaded pallet, said method comprising:
    conveying a loaded pallet to a first lift location on a loaded pallet conveyor in a loaded pallet conveying direction;
    raising at least a portion of the loaded pallet conveyor supporting the loaded pallet with a lift assembly at the first lift location to lift the loaded pallet to an unloading elevation;
    unloading the loaded pallet at the unloading elevation on to a product conveyor;
    conveying the products away from the first lift location on the product conveyor in a direction generally orthogonal to the loaded pallet conveying direction;
    lowering the unloaded pallet to a first pallet discharge elevation below the unloading elevation;

conveying the unloaded pallet in the loaded pallet conveying direction with the loaded pallet conveyor from the first lift location at the first pallet discharge elevation to an unloaded pallet conveyor;

lowering the lift assembly from the first pallet discharge elevation to receive another loaded pallet;

conveying the unloaded pallet on the unloaded pallet conveyor to a second lift location in a direction generally orthogonal to the loaded pallet conveying direction; and lowering the unloaded pallet at the second lift location below the first pallet discharge elevation for discharging the unloaded pallet.

8. The method of depalletizing a loaded pallet according to claim 7, further comprising:

conveying a second loaded pallet to the first lift location;

raising the second loaded pallet with the lift assembly at the first lift location to the unloading elevation;

unloading the second loaded pallet at the unloading elevation;

lowering the second unloaded pallet to the first palict discharge elevation;

conveying the second unloaded pallet with the loaded pallet conveyor from the first lift location at the first pallet discharge elevation to the unloaded pallet conveyor;

conveying the second unloaded pallet on the unloaded pallet conveyor to the second lift location onto the first unloaded pallet; and lowering the first and second unloaded pallets to an elevation below the first pallet discharge location for discharging the unloaded pallets.

9. The method of depalletizing a loaded pallet according to claim 8, further comprising lowering the lift assembly at the first lift location to receive a third loaded pallet after transferring the second unloaded pallet from the first lift location.

10. The method of depalictizing a loaded pallet according to claim 9, further comprising conveying the unloaded pallets after lowering the unloaded pallets at the second lift location to a second discharge elevation below the first elevation.

11. The method of depalletizing a loaded pallet according to claim 10, wherein said conveying the unloaded pallets after lowering comprises conveying the unloaded pallets in stacks.

12. A method of depalletizing a loaded pallet, said method comprising:

conveying a first plurality of loaded pallets in a loaded pallet conveying direction on a loaded pallet conveyor;

conveying a first loaded pallet of the first plurality of loaded pallets to a lift location in the loaded pallet conveying direction on the loaded pallet conveyor;

raising a portion of the loaded pallet conveyor wit a first lift assembly at the first lift location to raise the first loaded pallet to an unloading elevation;

unloading a product on the first loaded pallet at the unloading elevation on to a product conveyor, the product conveyor conveying the product in a direction generally orthogonal the loaded pallet conveying direction;

lowering the first unloaded pallet to a first pallet discharge elevation;

conveying the first unloaded pallet with the loaded pallet conveyor from the first lift location at the first pallet discharge elevation in the loaded pallet conveying direction to an unloaded pallet conveyor;

lowering the first lift assembly from the first pallet discharge elevation for receiving a second loaded pallet of the first plurality of loaded pallets;

conveying a second loaded pallet to the first lift location;

raising the second loaded pallet to the unloading elevation;

conveying the first unloaded pallet on the unloaded pallet conveyor to a second lift location in a first unloaded pallet conveying direction generally orthogonal to the loaded pallet conveying direction;

unloading the second loaded pallet at the unloading elevation;

lowering the second unloaded pallet to the first pallet discharge elevation;

conveying the second unloaded pallet with the loaded pallet conveyor from the first lift location in the loaded pallet conveying direction to the unloaded pallet conveyor;

lowering the first unloaded pallet below the first pallet discharge elevation; and conveying the second unloaded pallet in a second unloaded pallet conveying direction opposite said first unloaded pallet conveying direction on the unloaded pallet conveyor to the second lift location onto the first unloaded pallet for discharging the unloaded pallets.

13. The method of depalletizing according to claim 12, further comprising lowering the first and second unloaded pallets wherein the second unloaded pallet is below the first pallet discharge elevation for receiving another unloaded pallet.

14. The method of depalletizing according to claim 13, further comprising:

lowering the first lift assembly from the first pallet discharge elevation for receiving a third loaded pallet of the first plurality of loaded pallets;

conveying a third loaded pallet to the first lift location;

raising the third loaded pallet to the unloading elevation;

unloading the third loaded pallet;

lowering the third unloaded pallet to the first pallet discharge elevation;

transferring the third unloaded pallet from the first lift location to the second lift location onto the second unloaded pallet; and lowering the third, second and first unloaded pallets below the first pallet discharge elevation to a second pallet discharge elevation.

15. The method of depalletizing according to claim 14, further comprising:

conveying the third, second and first unloaded pallets from the second lift location.

16. The method of depalletizing a loaded pallet according to claim 12, further comprising:

conveying a second plurality of loaded pallets;

conveying a first loaded pallet of the second plurality of loaded pallets to a third lift location;

raising the first loaded pallet of the second plurality of loaded pallets with a third lift assembly at the third lift location to the unloading elevation;

unloading the first loaded pallet of the second plurality of loaded pallets at the unloading elevation onto the product conveyor;

lowering the first unloaded pallet of a second plurality of loaded pallets to the first pallet discharge elevation;

transferring the first unloaded pallet of the second plurality of loaded pallets from the third lift location at the first pallet discharge elevation to a conveyor; and
conveying the first unloaded pallet of the second plurality of loaded pallets to the second lift location.

17. The method according to claim 12, wherein said conveying the first unloaded pallet to the second lift location includes conveying the first unloaded pallet on a gravity feed conveyor.

18. The method according to claim 12, further comprising lowering the first unloaded pallet to a second pallet discharge location and, thereafter, conveying the first and second unloaded pallets from the second lift location in a stack.

19. The method according to claim 18, wherein said conveying the first and second unloaded pallets from the second lift location includes conveying the first and second unloaded pallets on a gravity feed conveyor in a slack.

* * * * *

UNITED STATES PATENT AND TRADEMARK OFFICE
CERTIFICATE OF CORRECTION

PATENT NO.         : 7,033,130 B2                                              Page 1 of 1
APPLICATION NO. : 10/348789
DATED              : April 25, 2006
INVENTOR(S)       : Michael B. Watson, Troy E. Coolbaugh and Thomas B. Smith It is certified that error appears in the above-identified patent and that said Letters Patent is hereby corrected as shown below:

Column 8:
Line 49, Claim 5, "pallers" should be --pallets--.

Column 9:
Line 21, Claim 8, "palict" should be --pallet--.
Line 38, Claim 10, "depalictizing" should be --depalletizing--.
Line 54, Claim 12, "wit" should be --with--.

Column 10:
Line 41, Claim 14, "transterring" should be --transferring--.

Column 12:
Line 8, Claim 19, "slack" should be --stack--.

Signed and Sealed this

Sixteenth Day of January, 2007

JON W. DUDAS
*Director of the United States Patent and Trademark Office*